March 21, 1939.　　　G. E. BRINKERHOFF　　　2,151,583
TYPE AND METHOD AND APPARATUS FOR PRODUCING THE SAME
Filed Jan. 5, 1938　　　2 Sheets-Sheet 1
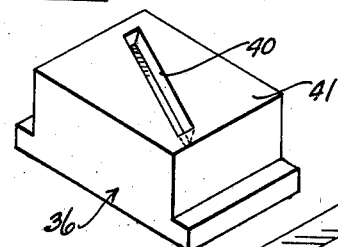
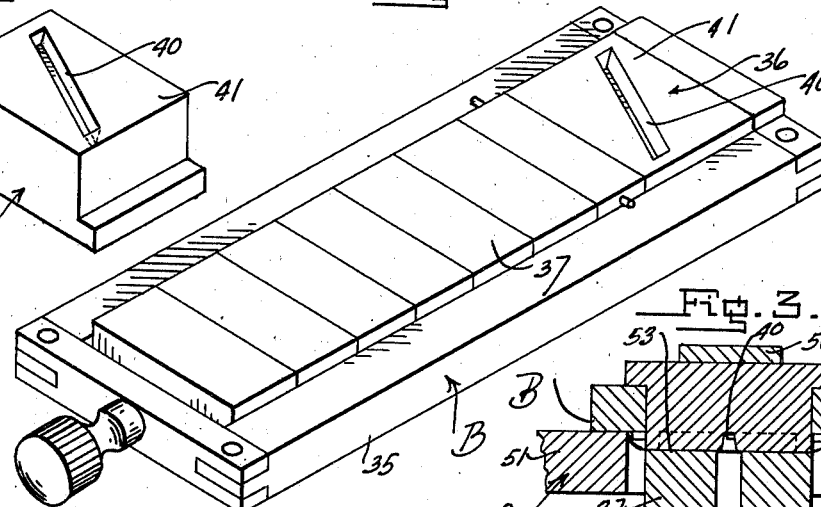
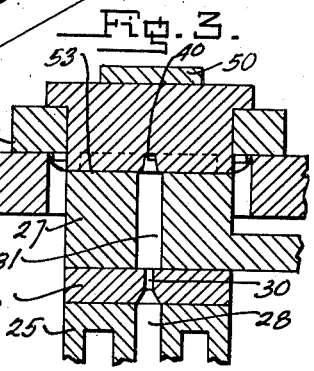
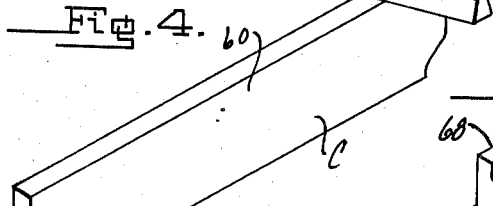
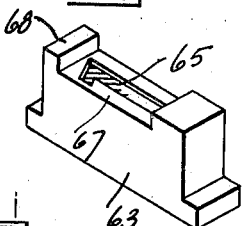
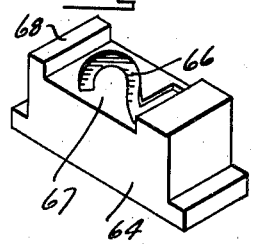
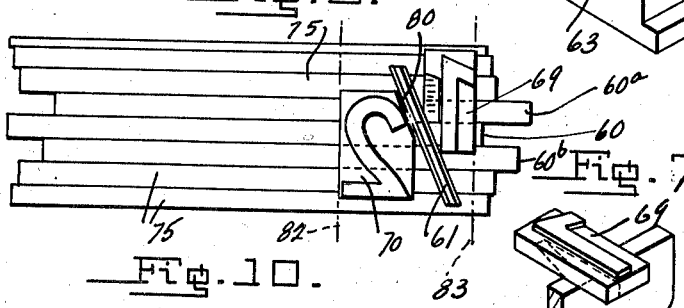
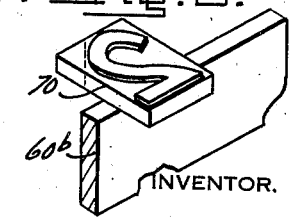
INVENTOR.
George E. Brinkerhoff
BY
ATTORNEYS.

March 21, 1939.  G. E. BRINKERHOFF  2,151,583
TYPE AND METHOD AND APPARATUS FOR PRODUCING THE SAME
Filed Jan. 5, 1938  2 Sheets-Sheet 2
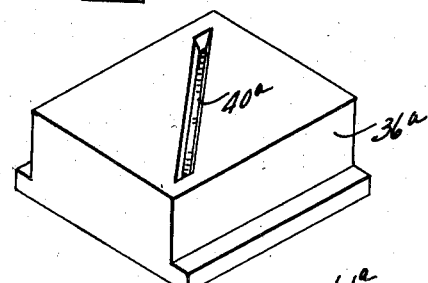
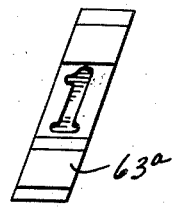
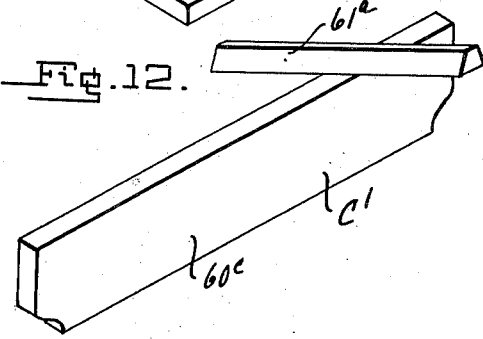
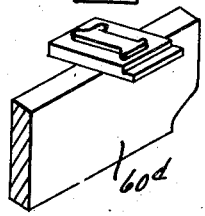
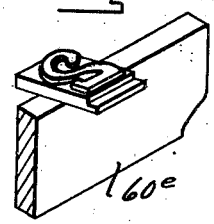
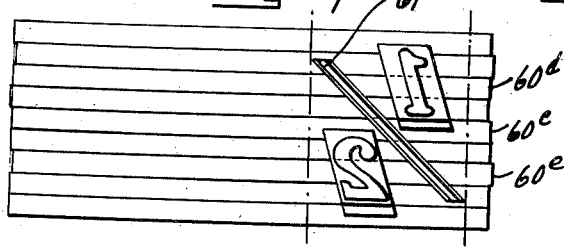
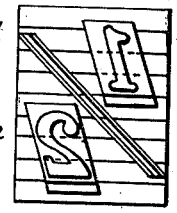
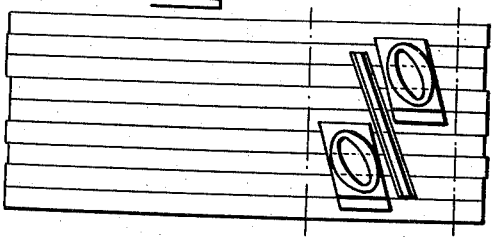
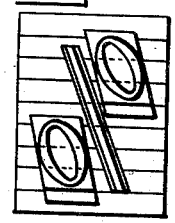
INVENTOR.
George E. Brinkerhoff
BY
ATTORNEYS.

Patented Mar. 21, 1939

2,151,583

UNITED STATES PATENT OFFICE 2,251,583

TYPE AND METHOD AND APPARATUS FOR PRODUCING THE SAME

George Edmon Brinkerhoff, Washington, D. C.

Application January 5, 1938, Serial No. 183,544

12 Claims. (Cl. 199—47)

This invention relates to improvements in type and has particular reference to improvements in means and methods for providing the component parts of type which have individual character parts, such as fractions.

A further object of this invention is the provision of an improved method for the manufacture of type fractions; the same being particularly adaptable for use in connection with the Ludlow typograph.

A further object of this invention is the provision of an improved type fraction, such as may be made upon the Ludlow typograph, wherein the numerator, denominator, and the division line between the numerator and denominator comprise individual parts with slugs so arranged thereon that the parts may be moved into proper compact relation.

A further object of this invention is the provision of an improved method and means for the formation of type fractions which will eliminate the necessity of carrying stock fractional parts in the different point fonts of type.

A further object of this invention is the provision of an improved division line type character for use in type fractions, which is of such nature that it may be selectively used with different numerator and denominator characters or other like symbols in providing a relatively compact type fraction or other character.

A further object of this invention is the provision of an improved type matrix.

A further object of this invention is the provision of an improved type casting assemblage.

Other objects and advantages of this invention will be apparent during the course of the following detailed description.

In the accompanying drawings, forming a part of this specification, and wherein similar reference characters designate corresponding parts throughout the several views, Figure 1 is a perspective view of an improved type matrix for the formation of division lines of fractions.

Figure 2 is a perspective view of the casting frame which is used in the typograph for supporting the matrices; showing the improved division line matrix assembled therein.

Figure 3 is a transverse section through the mould of a typograph machine, showing the matrix of Figure 1 in position for the moulding of a division line.

Figure 4 is a perspective view of the moulded division line, showing it in assemblage upon its narrow elongated slug or base bar.

Figure 5 is a perspective view of the matrix for the roman type fraction numeral 1.

Figure 6 is a perspective view of a matrix for the roman type fraction numeral 2.

Figures 7 and 8 are fragmentary perspective views of the moulded type characters respectively produced from the matrices of Figures 5 and 6.

Figure 9 is a plan view of the manner in which the different symbols or character parts of Figures 4, 7 and 8 are relatively assembled to produce a roman type fraction (½).

Figure 10 shows the completed type fraction after sawing off of the excess portions of the slug or base bars.

Figure 11 is a matrix used for the casting of a division line which is 45° off the vertical, and is preferably used in connection with italic fraction characters.

Figure 12 is the division line type formed with the matrix of Figure 11.

Figure 13 and 14 show respectively matrices for the formation of italic type characters 1 and 2.

Figures 15 and 16 show the italic type characters 1 and 2 formed according to the present invention.

Figures 17 and 18 correspond to the description of Figures 9 and 10, but they show italic type fraction characters.

Figure 19 is an italic type fraction of different point than that shown in Figure 18.

Figures 20 and 21 correspond to descriptions of Figures 9 and 10 respectively, but they relate to the formation of type characters such as the percentage symbol (%), since the means and method of forming characters is adaptable not only for the manufacture of fractions, but also other type symbols having component parts, such as the percentage mark (%) and also algebraic symbols, etc.

In the drawings, wherein for the purpose of illustration are shown preferred and modified forms of the invention, the letter A may generally designate a Ludlow typograph machine wherein a moulding frame B is placed for the moulding of type.

The machine A is generally of the nature disclosed in U. S. Patent #1,069,176 and 1,218,803, and for the purposes of the present invention includes a nozzle 25 with which is associated a squirt plate 26. An improved mould 27 is normally placed upon the squirt plate 28; the fluent heated metal passing through the way 28 of the nozzle and through the duct 30 of the squirt plate into the compartment 31 provided in the mould 27.

Generally the matrix support includes the frame 35; one or more matrices 36 being supported therein in the usual manner; the blank spaces being taken up by quards or slugs 37 in the usual manner.

It is the general purpose of the present invention to provide component parts of the fraction, such as the numerator, denominator, and division line with supporting bodies, bases, or slugs of bar-like form which are relatively narrow and elongated; the character portion of the component part of the type being cast directly thereon about centrally of the component part. These bar or slug bodies are then placed in substantial parallelism with additional similarly formed slugs to fill out the base, if found necessary. As will be noted from Figures 9, 10, and 17 to 21 of the drawings the numerator and denominator portions of the fraction are placed in vertical overlapping relation with the division line. This is made possible because the supporting slugs may be slid longitudinally in parallelism and the component parts placed as closely together as desired.

The matrix 36 preferably is of quadrilateral appearance and of a nature to fit in the frame 35. It is provided with a narrow elongated impression 40 impressed directly in the mould facing surface 41 of the matrix and preferably disposed at an angle of 22° off the vertical, for use in the formation of roman type.

The matrix support B is held by a presser foot 50 in place upon the mould bed 51, with the surface 41 of matrix 36 directly facing in contact with the casting face 53 of the mould 27. Of course, the impression 40 communicates with the mould slot 31 so that the metal may enter the slot 31 and the impression 40 will provide the type character C shown in Figure 4 which comprises the narrow elongated bar portion 60 having the division line 61 moulded thereon at an angle of 68° thereto.

The other component parts of the fraction, algebraic symbol, or the like are similarly formed; each with an elongated narrow base slug or body portion similar to the body portion 60 of the character C so as to permit an assemblage of the component parts similar to that shown in Figure 9.

Thus, as shown in Figures 5 and 6 matrices 63 and 64 have impressions 65 and 66 respectively, designating the character numerals 1 and 2 of the roman type, but they are formed in the bottom faces 67 of recesses. The matrix surfaces 68 contact the casting face of the mould, and the fluid metal enters the slot 31 of the mould, filling the depression in the matrix, and also the impression 65 or 66, as the case may be. Thus, as shown in Figures 7 and 8, the bars 60$^a$ and 60$^b$ which form the base or slug portions of the type character, have the shallow block portions 69 and 70 moulded directly thereon. The block portions 69 and 70 are of course only of about the same width as the letters which are moulded directly thereon. The slug bars 60$^a$ and 60$^b$ have the fractional characters moulded thereon at the intermediate portion of the character supporting blocks 69 and 70.

The parts are assembled as shown in Figure 9. The slug or body portions 60, 60$^a$ and 60$^b$ are disposed in parallelism, and if desired intermediate blank slugs or quads 75 are provided in order to vertically space the component parts of the fraction. Due to the fact that there is no mortising and other cut-away arrangements to the slug body the latter may be slid longitudinally so as to bring the component parts thereon into the proper relationship. If desired, corner portions of the blocks 69 and 70 may be cut away as shown at 80 in Figure 9 of the drawings, so that the fraction numerator and denominator portions may be brought as closely as desired to the division line 61. When this has been brought about the projecting ends of the body portions are cut off along the lines 82 and 83 to form the type fraction blocks designated en masse at D in Figure 10 of the drawings.

As before mentioned the oblique fraction line matrix can be used for any fraction combination. Six fraction matrices are sufficient to cover, in a practical manner, any face, point size, roman or italic fractions, as follows:

(1) Oblique division line 22° off the vertical-medium width line—for bold face roman type.

(2) Oblique division line 22° off the vertical-thin line—for light weight roman type.

(3) Oblique division line 22° off the vertical-heavy line—for black face roman type.

(4) Oblique division line 45° off the vertical-thin line—for bold face italic type.

(5) Oblique division line 45° off the vertical-thin line—for light weight italic type.

(6) Oblique division line 45° off the vertical-heavy line—for black face italic type.

The arrangements of the parts for italic type are shown in Figures 11 to 19 inclusive. The matrix 36$^a$ for the italic type division line has the division line impression 40$^a$ delineated therein at an angle of 45°. The matrices 63$^a$ and 64$^a$ shown in Figures 13 and 14 have the casting impressions and recesses formed the same as above described for matrices 63 and 64, except that the numerals are arranged for the production of italic type.

In Figure 12 the division line character C' has the slug 60$^c$ provided with a division line 61$^a$ thereon at an angle of 45°.

As shown in Figure 17 the italic type characters formed by the matrices 63$^a$ and 64$^a$ are at an obtuse angle to the line of the slug or body portions 60$^d$ and 60$^e$ on which they are respectively disposed.

The assemblage of italic type as shown in Figures 17, 18, and 19 is exactly the same as that described for the form of invention above detailed, and the formation of the percentage characters (%) as shown in Figures 21 and 22 is also similar.

The diagonal line matrix forms a division line for a fraction which is sufficient to serve for the larger fonts of type. When used for smaller font type the division line is sawed off at both ends, as can readily be understood to a length which harmonizes with the size of the figures being used in the fraction.

Various changes in the steps of the method of formation of the type, and in the arrangement of parts may be made to the forms of invention herein shown and described, without departing from the spirit of the invention or the scope of the claims.

I claim:

1. In a font of type, a character having upper and lower symbols, and a division line, said symbols and division line having narrow and elongated base portions disposed in relatively movable parallel relation and paralleling the type line so as to permit of relative positioning of the symbols on opposite sides of the division line in properly spaced relation with respect to each other and with respect to the division line.

2. In a font of type a character having upper and lower symbols and a division line, said symbols and division line having narrow separate base portions all of which slidably parallel the type line so as to permit of relative placement of the symbols on opposite sides of the division line in properly spaced relation.

3. In a type casting mechanism the combination of a mould formed with a narrow casting slot of elongated flat configuration wherein the body portion of the type is formed, and a type matrix having a fraction division line impression formed therein directly facing against the edge of the slot, said divison line impression overhanging beyond each side of the slot whereby the division line will be directly moulded to the casting face of the body portion of the type and overhanging beyond each side of the said body portion.

4. In a type casting mechanism the combination of a mould formed with a narrow casting slot of elongated flat configuration wherein the body portion of the type is formed, a type matrix having a straight division line impression formed therein directly facing against the end of the slot, said division line impression overhanging beyond each side of the slot whereby the division line is directly moulded to the casting face of the body portion of the type and overhanging beyond each side of the said body portion, and disposed at an angle of less than 90° thereto.

5. In a type casting mechanism the combination of a mould formed with a narrow casting slot and elongated to provide a relatively flat narrow body portion, and a type matrix having a recess therein facing the casting slot and a character forming impression in the recess also facing the said slot, said recess being of a size substantially conforming to the width and length dimensions of the character represented by said impression, said recess overhanging beyond each side of the casting slot whereby a type will be formed with the character and the portion on which it is directly moulded attached to the body portion and overhanging beyond each side thereof.

6. As an article of manufacture a division line type character for type fractions, etc., comprising a flat elongated narrow horizontal base having a division line moulded thereon in a line transverse to the base and overhanging beyond each side of the narrow base portion.

7. As an article of manufacture a division line type character for fractions, etc., comprising a flat horizontally elongated narrow base having a division line moulded thereon in a line transverse to the base and overhanging beyond each side of the narrow base portion and in oblique angular relation to the length thereof.

8. As an article of manufacture a single character type comprising a narrow flat body portion having a type character base moulded on an upper edge of the body portion in overhanging relation with the opposite sides of the narrow body portion, said base being shallow and having the type character delineated thereon, said base being of a width approximately equal only to the width of the type character itself.

9. The method of providing type having a plurality of character parts, which consists in casting each character part of the type individually upon a narrower flat body portion which is elongated transverse to the height of the type, and the thickness of which measured in the direction of the height of the character cast thereon is appreciably less than the height of said character, and then bringing said body portions into side by side parallelism, with the characters parts in proper relation.

10. The method of providing type fractions which consists in casting the numerator, denominator, and division line upon separate base portions of narrow elongated bar-like configuration which in length extend parallel with the type line, and then horizontally disposing the base portions of the numerator and denominator upon opposite sides of the division line bar portion and moving them to relatively position the numerator and denominator portions in properly spaced relation at opposite sides of the division line.

11. The method of providing fractions for type sets which consists in forming the numerator, denominator and division line of a fraction separately upon the upper edges of uniformly shaped bar-like body portions with fraction parts each overhanging the opposite sides of the respective body portions, and then assembling said bar portions of the numerator and denominator at opposite sides of the bar portion of the division line and moving them longitudinally in parallelism to closely position the component parts of the fraction in vertical overlapped relation.

12. In a font of type a character provided with upper and lower symbols and a division line, said symbols and division line having narrow base portions which are elongated horizontally and parallel with the type line so that they may be slid horizontally to relatively position the symbols and division line, and narrow horizontally elongated spacer bars disposed between the base portions of said symbols and division line so as to properly space the symbols and division lines vertically.

GEORGE EDMON BRINKERHOFF.